J. R. COMBS.
SALARY COMPUTER.
APPLICATION FILED JUNE 1, 1916.

1,272,225.

Patented July 9, 1918.
12 SHEETS—SHEET 1.

WITNESSES

INVENTOR
James R. Combs
BY
ATTORNEYS

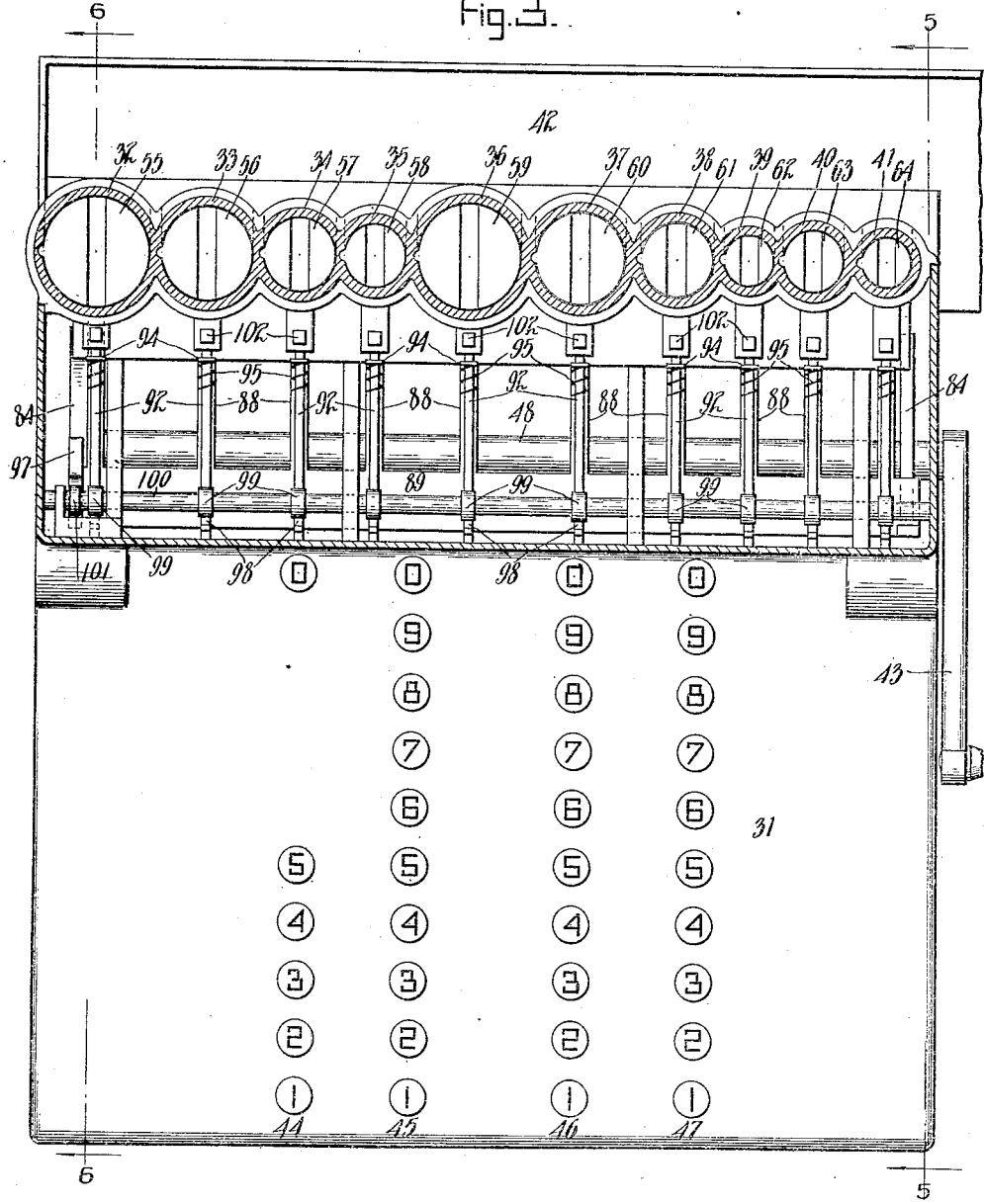

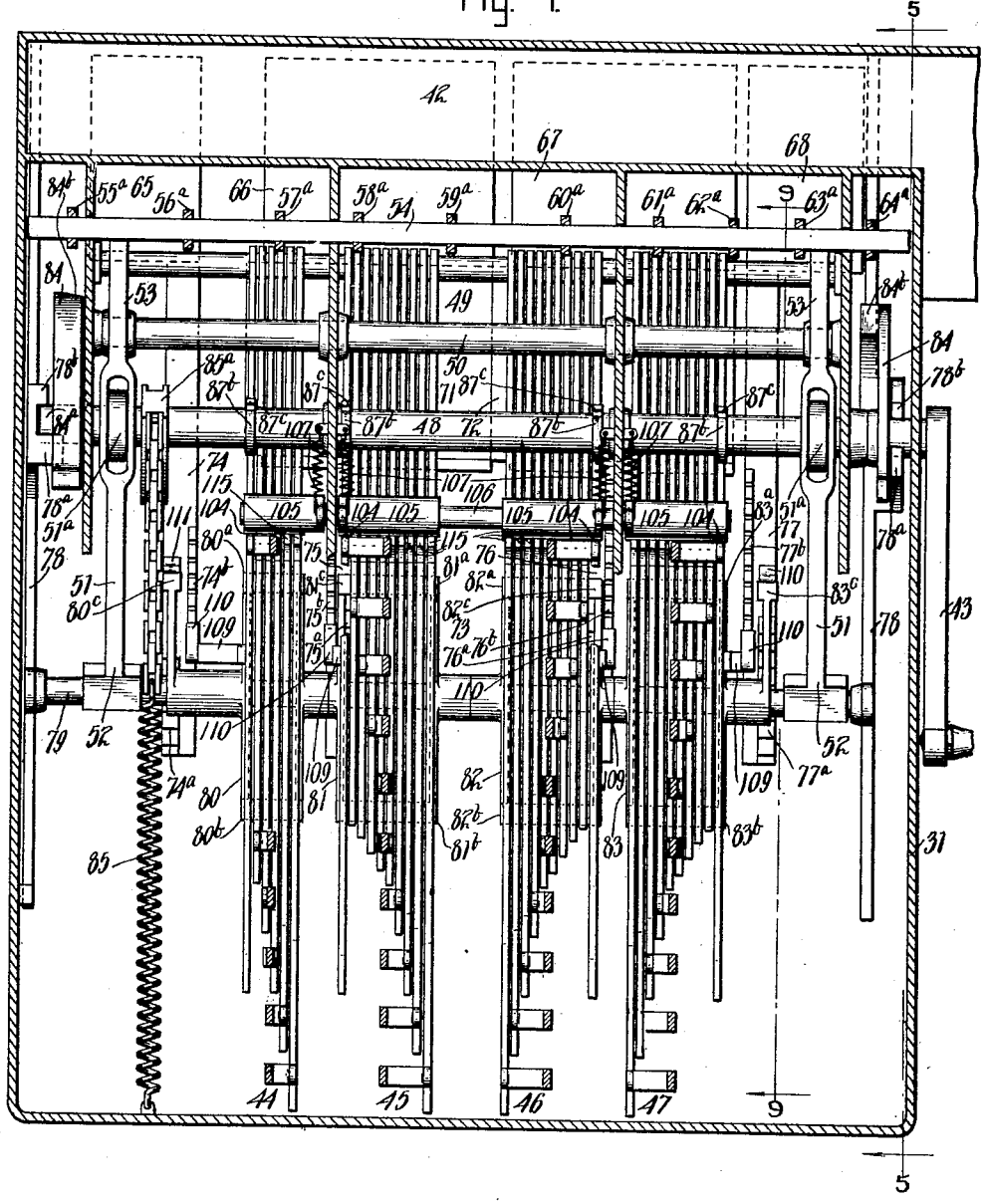

J. R. COMBS.
SALARY COMPUTER.
APPLICATION FILED JUNE 1, 1916.
1,272,225.
Patented July 9, 1918.
12 SHEETS—SHEET 4.
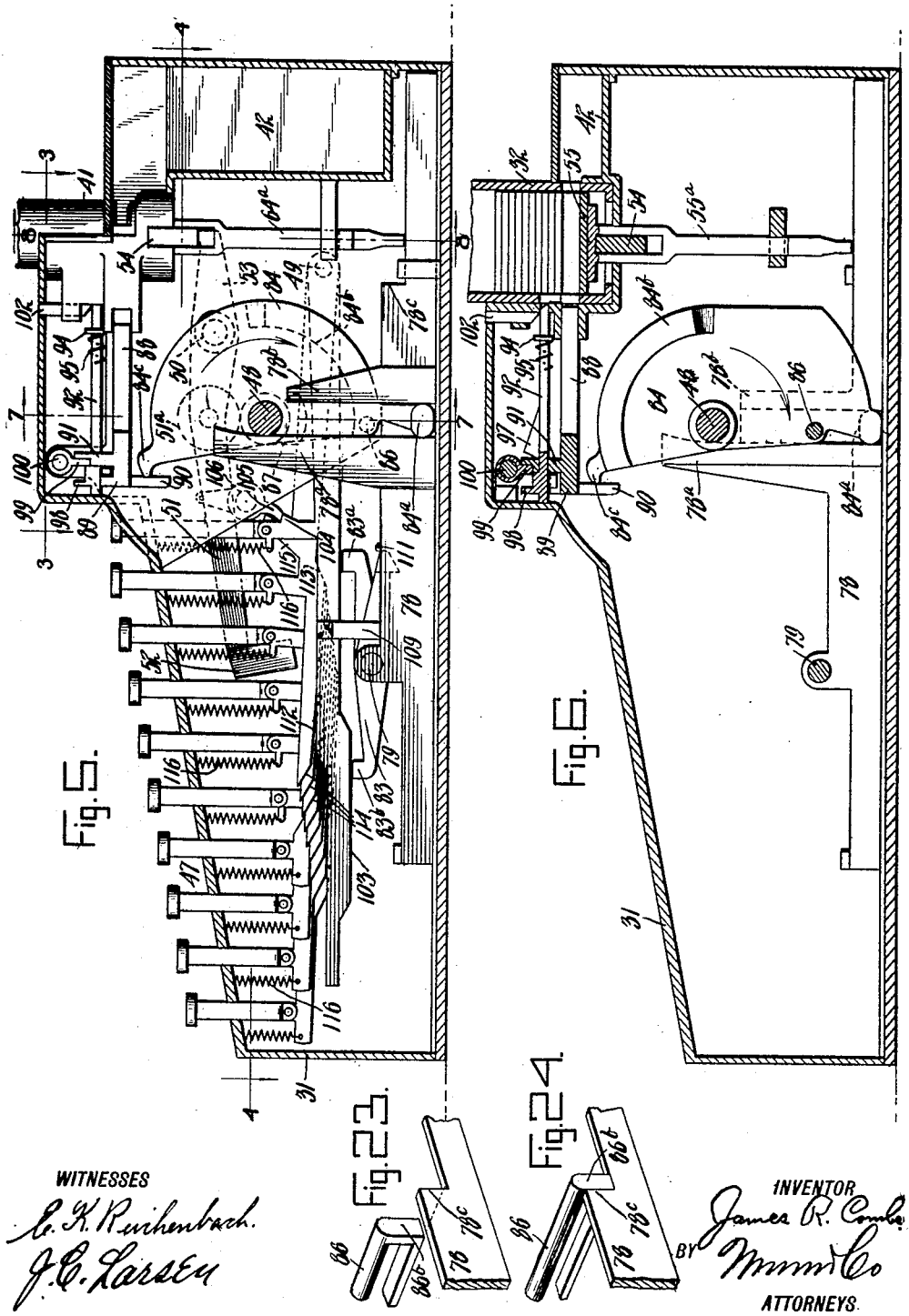

J. R. COMBS.
SALARY COMPUTER.
APPLICATION FILED JUNE 1, 1916
1,272,225.
Patented July 9, 1918.
12 SHEETS—SHEET 5.
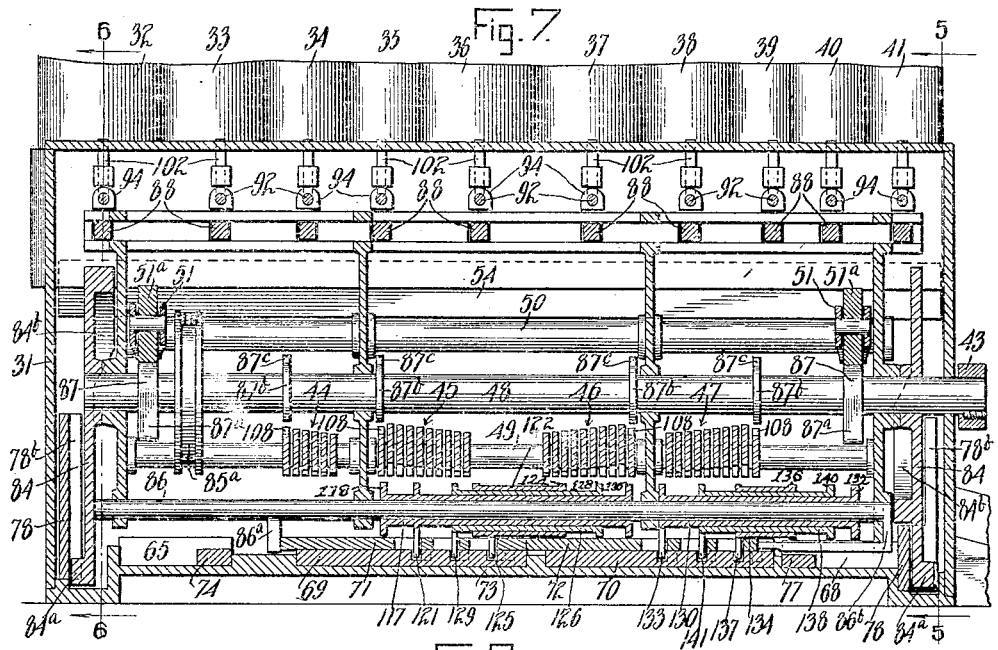
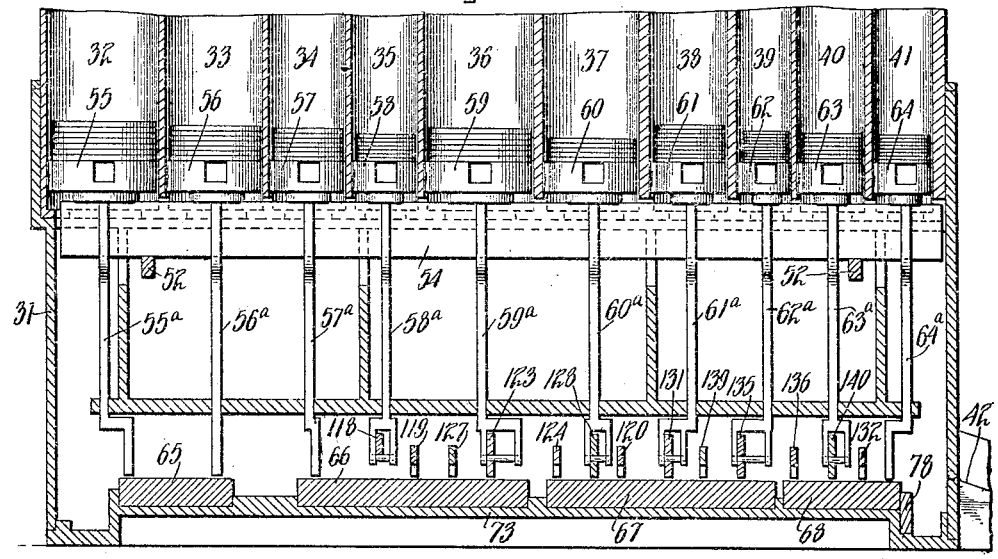

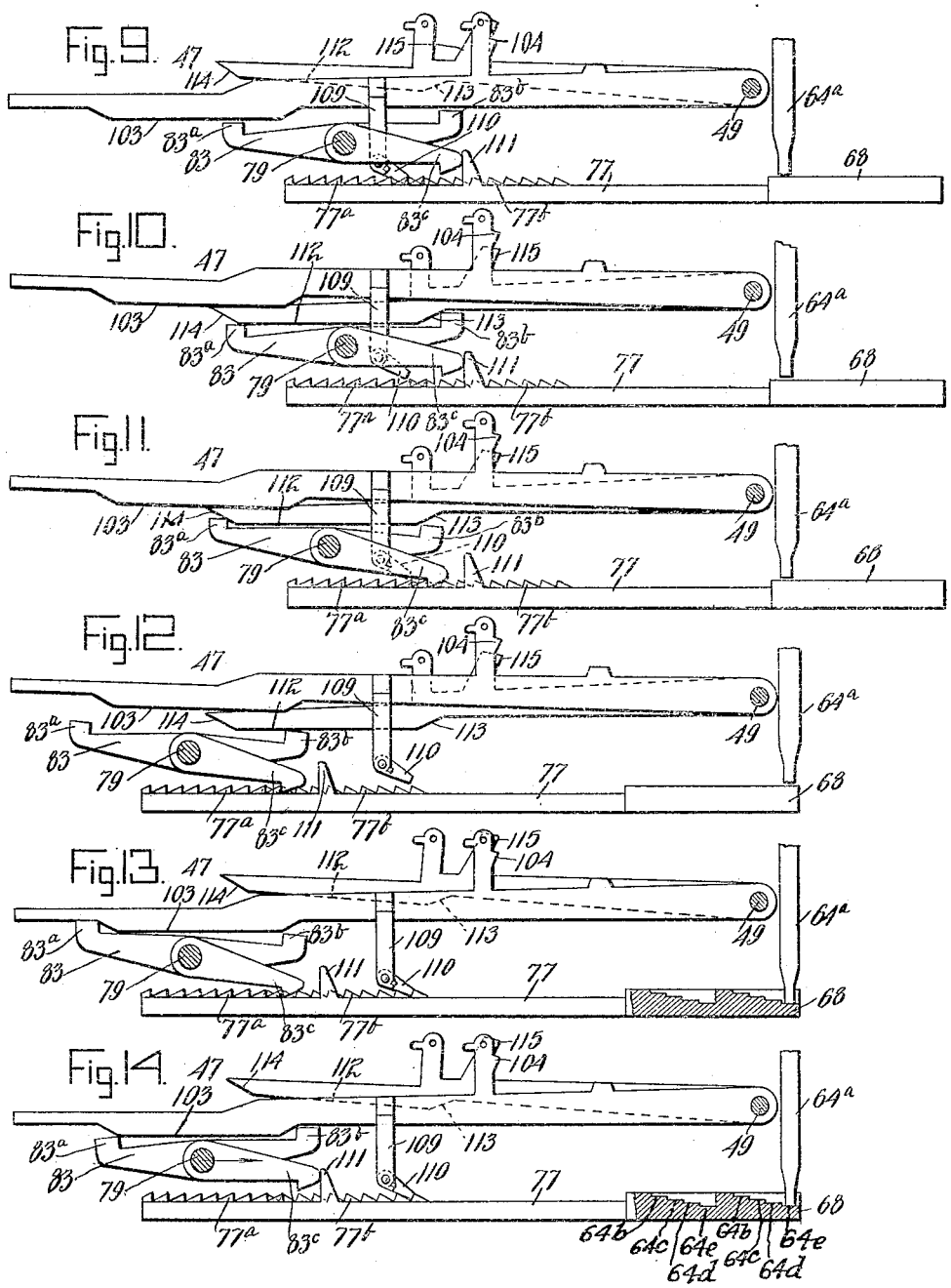

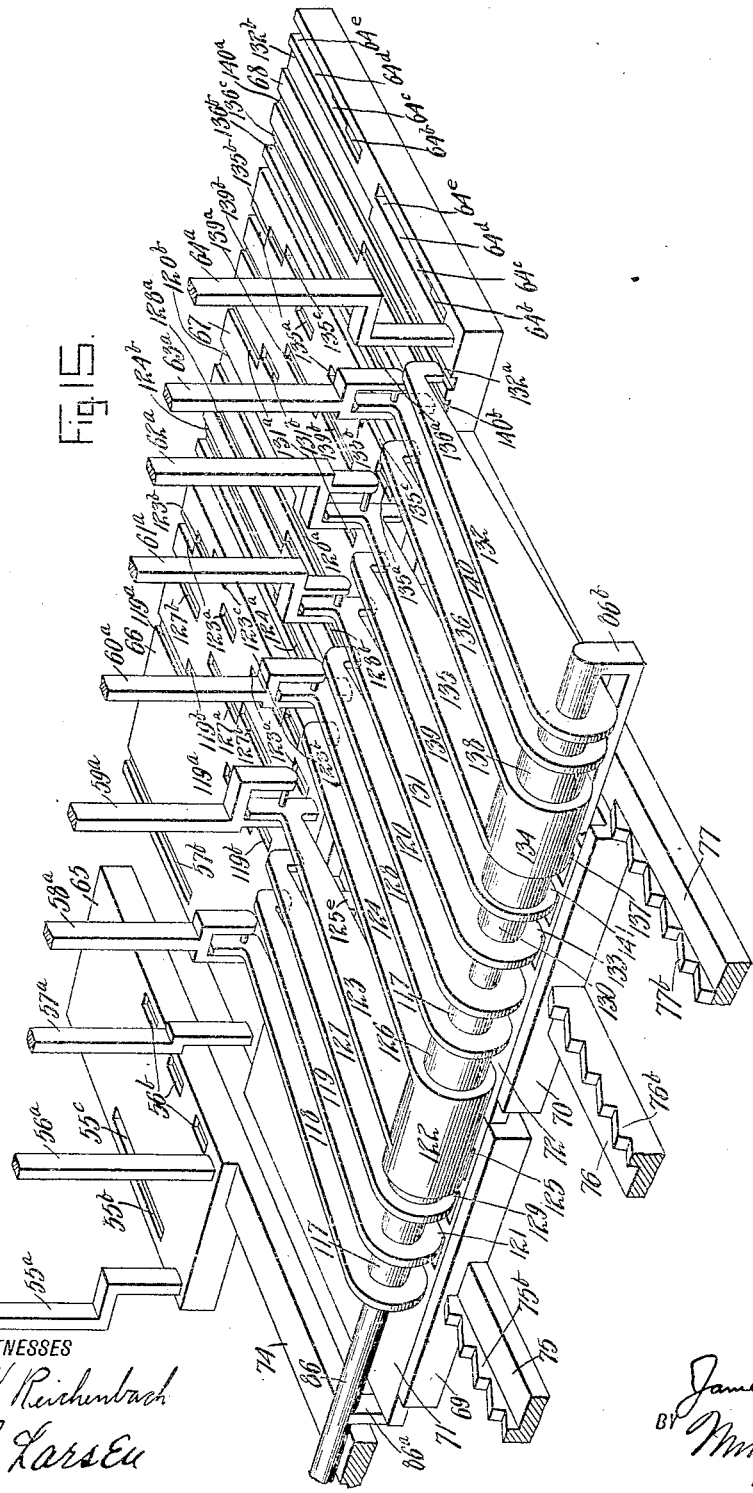

J. R. COMBS.
SALARY COMPUTER.
APPLICATION FILED JUNE 1, 1916.

1,272,225.

Patented July 9, 1918.
12 SHEETS—SHEET 9.

WITNESSES:

INVENTOR
James R. Combs
BY
ATTORNEYS

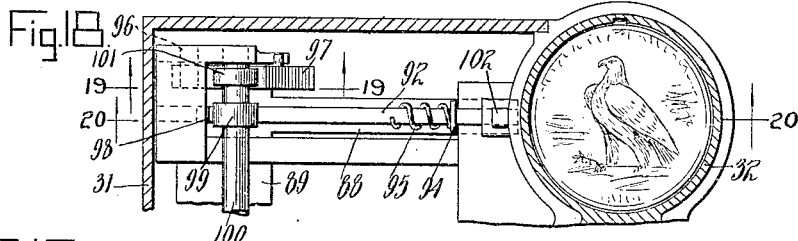
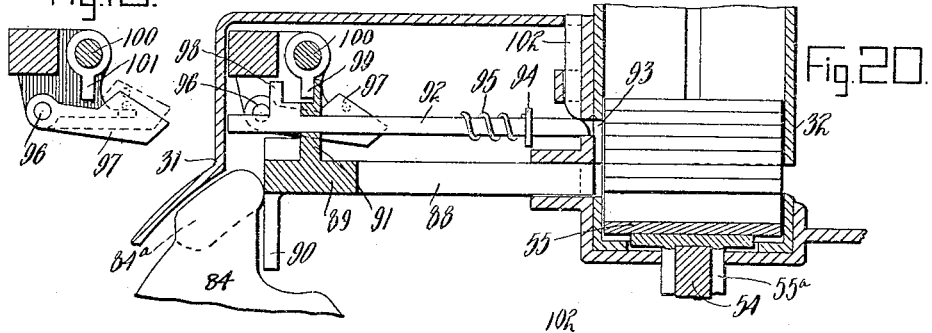
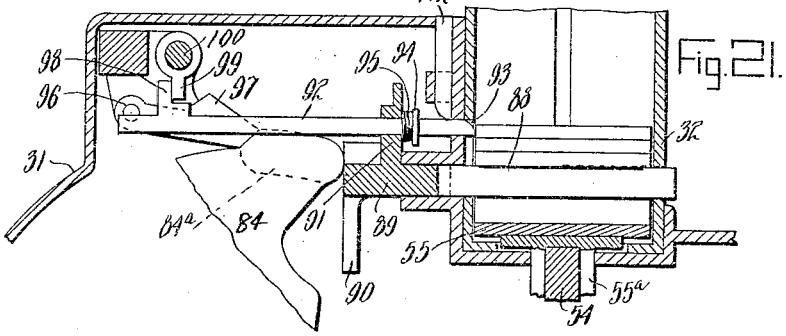
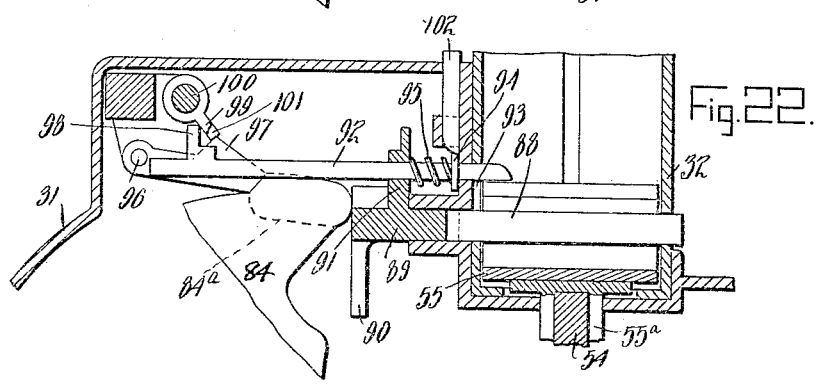

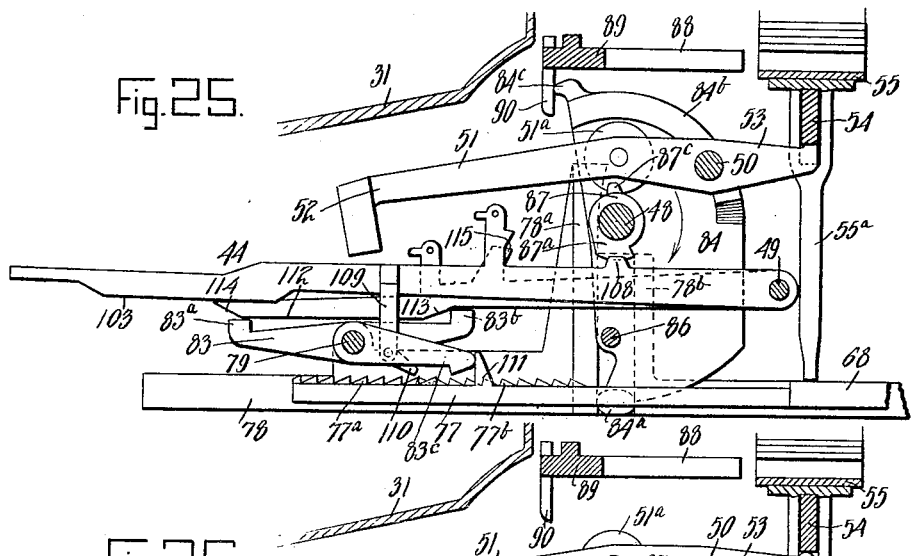

UNITED STATES PATENT OFFICE.

JAMES R. COMBS, OF NEW YORK, N. Y.

SALARY-COMPUTER.

1,272,225. Specification of Letters Patent. Patented July 9, 1918.

Application filed June 1, 1916. Serial No. 101,044.

*To all whom it may concern:*

Be it known that I, JAMES R. COMBS, a citizen of the United States, and a resident of the city of New York, borough of Manhattan, in the county and State of New York, have invented certain new and useful Improvements in Salary - Computers, of which the following is a specification.

My invention relates to the delivery of currency, as in gold, silver, and other coins, and one of the main objects thereof is to provide a machine whereby individual monetary amounts may be accurately and instantly made up in the fewest denominational units, as for varying wages of a force of employees, thus enabling the paying off of a force in an expeditious manner.

A further object is to provide such a machine wherein the zero keys of the several banks are normally in depressed positions as a means of safety by reason of the fact that they prevent functioning of the machine when no calculation has been or is being made although the operating handle may be freely moved.

A further object is to provide such a machine in which a free keyboard is employed to return all keys to normal positions after a calculation in a different manner than in any other machines now known to me.

A further object is to provide such a machine wherein mistakes may be readily rectified at any time before the completion of an operation.

A further object is to provide positive operating means for the main elements of the machine, thereby dispensing with springs or the equivalent for such main parts.

A further object is to provide such a machine in a compact and foolproof form, and of few parts not likely to get out of order.

A further object is to accomplish the desired results by means of certain grooved elements movable forwardly and rearwardly into set positions, and of supplemental control grooved elements movable forwardly and rearwardly at one period and laterally at another period into set positions to select the coin stacks from which ejection is to occur and to control the number of coins so ejected from each.

A further object is to provide a low-coin warning and lock, whereby machine operation is prevented when the coins are low in any of the stacks, and which indicates which of the stacks may be in a depleted condition.

A further object is to provide means for delivering the ejected amounts directly beneath the hand of the operator ready to be instantly grasped and handed to an employee, thus expediting the paying off of a force of employees.

My invention is fully described in the following specification, of which the accompanying drawings form a part, in which like characters refer to like parts in each of the views, and in which:—

Fig. 3 is a section taken on the line 3—3 of Fig. 5;

Fig. 4 is a section taken on the line 4—4 of Fig. 5;

Fig. 5 is a section taken on the lines 5—5 of Figs. 3, 4 and 7.

Fig. 6 is a section taken on the line 6—6 of Figs. 3 and 7;

Fig. 7 is a section taken on the line 7—7 of Fig. 5;

Fig. 8 is a section taken on the line 8—8 of Fig. 5;

Fig. 9 is a section taken on the line 9—9 of Fig. 4;

Figure 16:
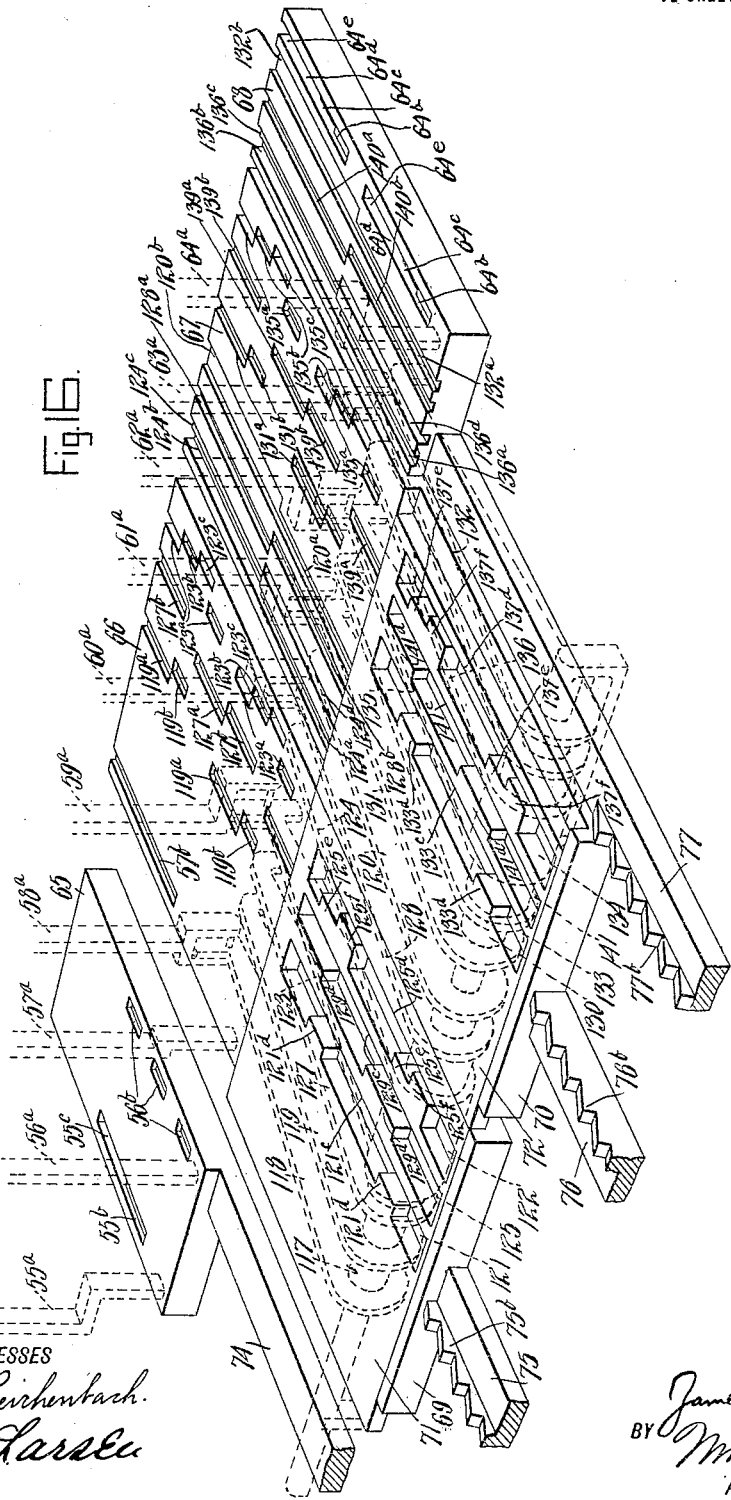
Figure 17:
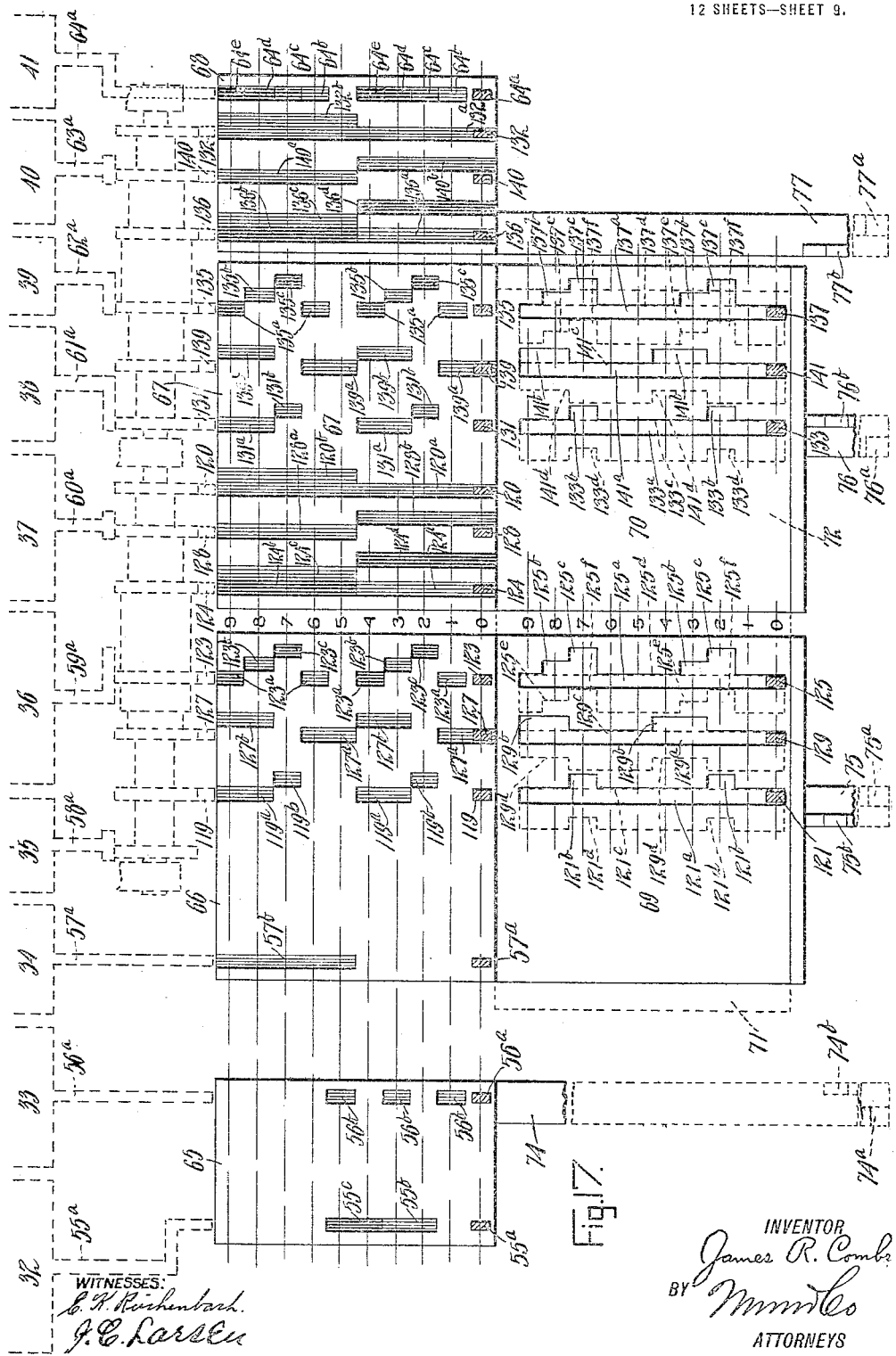

Fig. 10 to Fig. 14, inclusive, are views similar to Fig. 9 and showing different stages of the operation;

Fig. 15 is a detached view, in perspective, of the coin selecting elements;

Fig. 16 is a view similar to Fig. 15 but with the stack control levers eliminated, although indicated by dotted lines;

Fig. 17 is a plan view of certain of the grooved elements employed in the machine for coin selection;

Fig. 18 is an enlarged fragmentary section taken on the line 3—3 of Fig. 5, of the coin ejecting and low-coin warning members;

Fig. 19 is a section taken on the line 19—19 of Fig. 18;

Figs. 20, 21 and 22 are sections taken on the line 20—20 of Fig. 18, showing steps in the coin ejection and in the low-coin warning;

Figs. 23 and 24 are different positions of a lock used in the machine;

Figs. 25 to 30, inclusive, are views showing the different stages of operation of the machine, somewhat diagrammatic.

Referring to the drawings, 31 represents a casing for the operating parts on the machine, said casing supporting a plurality of coin stacks, 32 for twenty dollar gold coins, 33 for ten dollar gold coins, 34 for five dollar gold coins, 35 for two and one-half dollar gold coins, 36 for silver dollars, 37 for fifty cent coins, 38 for twenty-five cent coins, 39 for ten cent coins, 40 for five cent coins, and 41 for pennies, all of said stacks opening into a chute 42 terminating just below the forward position of the handle of the operating crank 43 ready to be grasped and handed out.

At 44, 45, 46 and 47 are shown separate banks of digit keys from zero to nine, each, the zeros of all the banks being at the tops thereof and being normally held in depressed condition in a manner to be explained, the depression of any key releasing the zero key of its bank thereby placing the corresponding operative elements into operative position and, upon the conclusion of a machine operation, the zero keys are all depressed and release any other keys which might have been previously depressed for an ejection, and thus produces a free keyboard, which, however, does not use the strips used in other machines of this class now known to me.

Within the machine are a plurality of partitions for supporting some of the operating parts, shown four in number in Fig. 4, the operating shaft 48 being journaled therein as well as a shaft 49 for the key levers and a shaft 50 for the stack lock-bar levers 51 two of which are provided having weighted free ends 52 and shorter ends 53 supporting a lock-bar 54 extending beneath all the coin stacks to normally prevent downward movement of the pistons 55, 56, 57, 58, 59, 60, 61, 62, 63 and 64 of the respective stacks 32, 33, etc., the rods of which extend downwardly to a point slightly above grooved plates 65, 66, 67 and 68 for the banks 44, 45, 46 and 47, respectively.

The grooved plates 65, 66, 67 and 68 are of uniform thickness, the plates 66 and 67 having extensions 69 and 70 thereon provided with lateral recesses for slidable plates 71 and 72, these extensions also being grooved and the slidable plates slotted as will be later described.

The grooved plates 65, 66, 67 and 68 are slidable inwardly and outwardly in a guide plate 73, Figs. 7 and 8, and are provided, each, with a ratchet bar 74, 75, 76 and 77, respectively, the first of which has five outwardly facing teeth $74^a$ and six inwardly facing teeth $74^b$, and the others of which have nine outwardly facing teeth $75^a$, $76^a$, and $77^a$, and ten inwardly facing teeth $75^b$, $76^b$, and $77^b$, respectively. The grooved plates 65, 66, 67 and 68, together with the extensions 69 and 70, and contained plates 71 and 72, may be moved inwardly by means of the teeth $74^a$, $75^a$, $76^a$ and $77^a$ into each of nine definite positions, and may be locked in initial or adjusted positions by means of the teeth $74^b$, $75^b$, $76^b$ and $77^b$.

Slidably arranged at the ends of the machine are pawl carrier plates 78 joined by a rod 79 having four pawls 80, 81, 82 and 83 freely movable thereon, one for each bank of keys, having relatively wide arms $80^a$ and $80^b$, $81^a$ and $81^b$, $82^a$ and $82^b$, $83^a$ and $83^b$, and pawls $80^c$, $81^c$, $82^c$ and $83^c$, respectively, these last named being adapted to engage the respective ratchet bars 74, 75, 76 and 77 when the pawls 80, 81, 82 and 83 are rocked in a manner to be explained, whereby the grooved plates may be adjusted inwardly of the machine.

The pawl carrier plates 78 are provided, each, with two upwardly directed spaced arms $78^a$ and $78^b$, Fig. 5, of which the former is the longer, and the operating shaft 48 carries a cam 84 adjacent each of the plates 78 and provided with a lug $84^a$, each, extending between the respective arms $78^a$ and $78^b$ whereby, when said shaft is rotated in the direction of the arrow, Fig. 25, the pawl carriers 78 move inwardly toward the operator and carry all the pawls therewith, this movement being positive and always through the same distance, in the inward direction by means of the outward movement of the operating crank 43 and outwardly by means of a coil spring 85 and a drum $85^a$ secured to the operating shaft 48 which spring returns the operating crank 43 to normal position after an operation.

The cams 84 each carry an inwardly directed offset $84^b$ and a peripheral lug $84^c$, the latter being approximately diametrically opposite the respective lugs $84^a$ and the inclined ends of the offsets $84^b$ being approximately midway between the respective lugs, these parts being definitely located to time the action thereof on the parts actuated thereby.

Slidably arranged in the partitions of the casing is a rod 86 directly beneath the operating shaft 48, Figs. 5, 6, 7, 15, and 23 to 30 inclusive, and provided with a depending arm $86^a$ and a downwardly directed angular member $86^b$, Fig. 7, bearing on the outer sides of the laterally slidable plates 71 and 72 and holding said plates together and, in the rotation of the operating shaft from normal position, the offset $84^b$ on the left hand cam 84 forces the rod 86 to the right and thus moves the plates 71 and 72 to the right whereas, in the return of the operating shaft to normal position, the offset $84^b$ of the right hand cam 84 returns said rod to normal position, as well as the plates 71 and 72, said offsets being reversely arranged as shown in dotted lines in Fig. 5 and in full lines in Fig. 6, the movement of the rod and plates thus being positive in both directions.

The operating shaft 48 also carries two smaller cams 87, Figs. 7 and 25 to 30 inclusive, each of which is provided with an offset 87$^a$ engaging a roller 51$^a$ on the respective stack lock-bar levers 51 to raise the weighted ends thereof and thus allow the lock-bar 54 to descend to release the stack pistons, and said shaft also carries four cams 87$^b$ having, each, an offset 87$^c$ whose function is to return the zero keys to normal depressed position, after a machine operation, if they had been moved therefrom in the manual depression of the keys.

Reverting to the sliding rod 86 and the pawl carrier plates 78, attention is drawn to Figs. 23 and 24, the former of which shows the right hand end of the rod and the right hand plate in normal positions and the latter of which shows them in alternate positions and in which the plates 78 have been moved to their inward limit and the rod 86 has been likewise moved to the right for its limit of movement, and in which position the rod passes behind a shoulder 78$^c$ of the said plate and locks the plates 78 against outward movement to normal position and holds the plates in this position until the rod 86 is moved toward the left into normal position.

By reference to Figs. 3, 8, 20 to 22, and 25 to 30, it will be seen that each coin stack is pierced from front to rear to provide a passage for an ejector bar 88 also seated in a groove in the upper surface of the respective piston and substantially flush therewith when said piston is in its normal raised position, the two extreme positions of said ejector bars being shown in Figs. 20 to 22, the said ejector bars being integral with a carrier bar 89 suitably guided and provided with inner shoulders adapted to have the lugs 84$^a$ impinge thereon in the forward rotation of the cams 84 to force the ejector bars forwardly to eject from the particular stacks which have been affected by the selective mechanism to be described, and said carrier bar carries dependent arms 90 adapted to be engaged by the lugs 84$^c$ in the return of the cams 84 to normal positions to return the ejector bars to normal positions.

In Figs. 18 to 22 is shown a low coin warning device and lock, comprising a standard 91 carried by the ejector bar carrier 89 having a horizontal bar 92 slidable therein for each of the coin stacks and adapted to enter the respective stacks through an aperture 93, each bar 92 having a stop 94 and coil spring 95 thereon and the latter of which is adapted to be collapsed by the standard 91 in the forward movement of the ejector bar carrier to force the bars 92 into the respective stacks when the level of the coins is beneath the said bars 92. Pivoted at 96 to one end of the casing is a detent 97 adapted to drop behind the respective cam lug 84$^a$ when the cams have reached their coin ejecting positions, Figs. 21 and 22, but this detent does not normally prevent backward movement of the cam 84. Each low coin bar 92 carries an upwardly directed finger 98 adapted to impinge on the respective one of a plurality of arms 99 carried by a rock shaft 100 in turn provided with a supplemental arm 101 arranged in the plane of the detent 97 and, when the coins are low in any stack, the respective bar 92 will be forced into the stack, as shown in Fig. 22, and this will rock the shaft 100 and swing the supplemental arm 101 against the rear of the detent 97 and prevent its rising to release the cam 84 and thereby preventing the return of the operating crank to normal position. Arranged adjacent each stack is a vertically movable pin 102 the lower ends of all of which are beveled whereby said pins may be forced upwardly by the respective stops 94 when the corresponding stacks are in dangerously depleted condition and, rising above the top of the machine casing, said pins will indicate which of the stacks require replenishing.

Independently pivoted on the shaft 49 are a plurality of key levers, one for each key, said levers being arranged in distinct groups corresponding to the banks of keys 44, 45, 46 and 47, Fig. 4, these levers being of two types, one type for the zero keys and the other type for the remaining keys, although the several levers of the latter type vary in length in each group, being stepped down from the "1" key lever to the "9" key lever, each lever being in pivotal connection with the respective key and being so mounted as to insure an equal distance of depression of the keys. In view of the key lever structure it is believed that a description of each type will be sufficient and will tend to prevent confusion in the drawings because of a multitude of reference characters, although the key levers are identified with respect to their keys in Fig. 4.

The zero levers are alike, one being shown in Figs. 9 to 14 and in Figs. 25 to 30, as is also a "9" lever, each zero lever having a lower edge 103 against which the arm 83$^a$ may ride and of a length at least equal to the distance of a nine space movement of the grooved plates 65, 66, 67 and 68, the arm 83$^a$ being on the rocking pawl 85 and corresponds to the bank of keys 47 and to the grooved plate 68. The edge 103 prevents upward movement of the arm 83$^a$ and thus of downward movement of the pawl 83$^c$ into engagement with the teeth 77$^a$ on the bar 77 of the grooved plate 68 and, with the zero key in normally depressed position, the pawl carrier may be moved inwardly without moving the grooved plate 68. Each zero lever is provided with a tooth 104 adapted to be held beneath a relatively wide pawl 105 pivoted at 106 and held in such locking position by a spring 107, Figs. 4 and 5, each pawl 105 being of a width exceeding the width of the respective group of key levers, and each zero lever is also provided with a tooth 108 adapted to be engaged by the offset 87ᶜ on the respective cam 87ᵇ to force the zero lever into depressed condition upon the return of the operating crank to normal position, Fig. 29, in which position it is held by the pawl 105, there being one of the cams 87ᵇ for each of the zero levers. Each zero lever is also provided with a dependent bar 109 carrying a pivoted pawl 110 adapted to engage the teeth 77ᵇ of the ratchet bar 77 to prevent inward movement of the plate 68, Fig. 29, but this pawl 110 does not prevent outward movement of the said plate 68.

After the pawl carriers have been moved to their innermost limit by means of the operating crank they may return to normal positions without affecting the position of the plate 68, with the zero key in depressed position, unless the plate 68 had been moved from normal position in which event the pawl arm 83ᶜ strikes against a post 111 on the ratchet bar 77 and forces the plate 68 back to normal position.

The other type of key levers provides a member 112 on the under side of each lever terminated by inclines 113 and 114, these members being in successively increased distances from the pivot shaft 49 beginning with the "9" lever and ending with the "1" lever, and each of these levers is provided with an arm 115 adapted to pass beneath the pawl 105 when the lever is depressed, thus locking this lever in depressed position and, because of the release of the said pawl from the zero lever of this bank or group, this zero lever will rise because of the spring 116, one of which is provided for each key lever, one pawl 105 being operable upon all the levers of each group so that, when any lever is depressed, it releases any previously depressed lever and is itself locked in depressed position.

Fig. 9 shows the normal positions of the "0" and "9" levers, in which movement of the pawl carrier does not affect the grooved plate 68; Fig. 10 shows the "9" lever depressed and the "0" lever raised, whereby, in the inward movement of the pawl carrier, the arm 83ᵇ of the pawl rides down the incline 113 to force the pawl 83ᶜ into engagement with the teeth 77ᵃ at once to carry the plate 68 inwardly for its full nine space movement, the pawl arm 83ᵃ riding up the incline 114.

If the "8" lever had been depressed, the member 112 thereof being one step inward of that on the lever "9," the pawl carrier would have moved one space before the pawl arm 83ᵇ would have forced the pawl 83ᶜ into ratchet bar engagement, and the plate 68 would thus have been moved eight spaces. The member 112 of the "1" lever being farthest away from that of the "9" lever, the pawl carrier would have moved through eight spaces before the pawl would have been rocked into locking engagement with the teeth 77ᵃ by the "1" lever, and the grooved plate 68 would thus have been moved but one space, and corresponding degrees of movement of the plate 68 occurs for the intervening levers.

Figure 28:
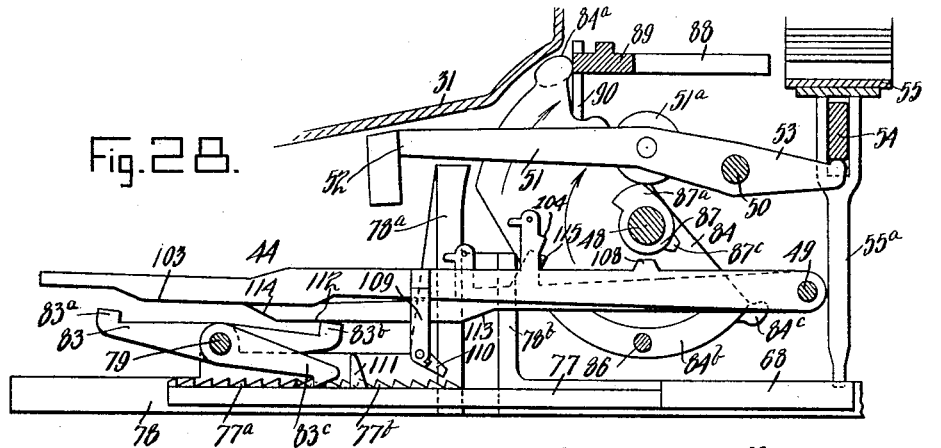
Figure 29:
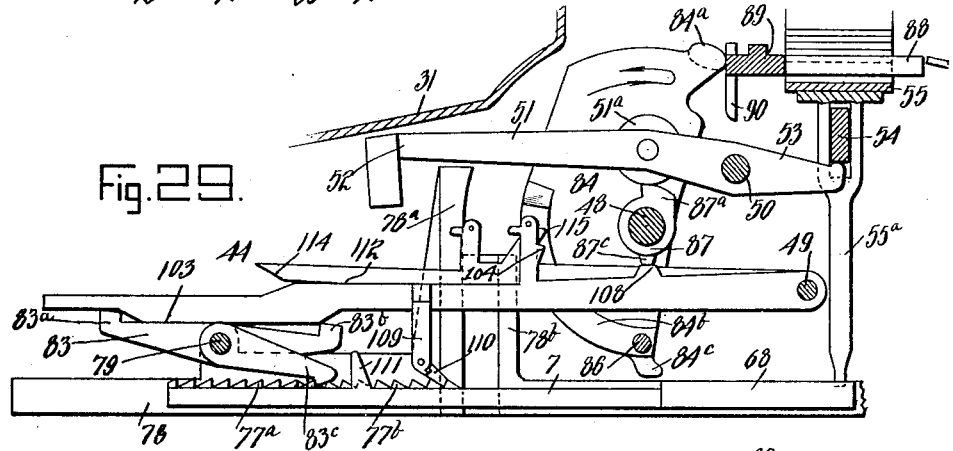
Figure 30:
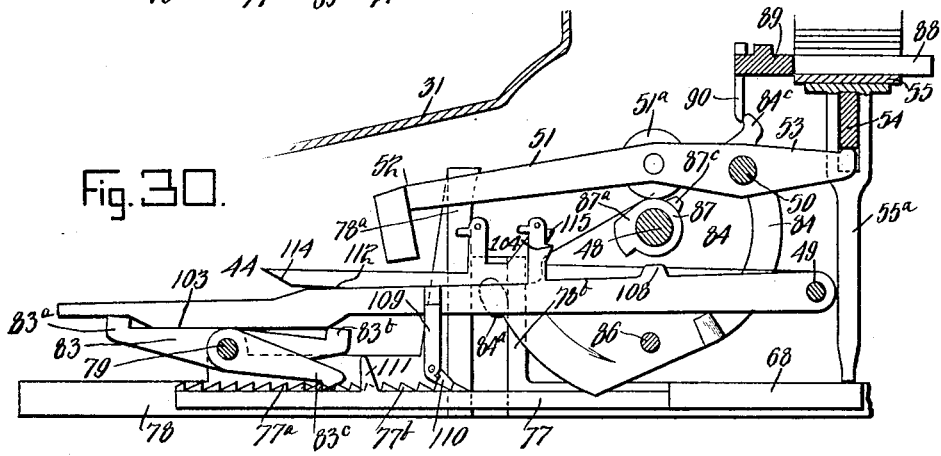

Fig. 11 shows the positions of the parts at the moment of pawl engagement with the ratchet bar teeth 77ᵃ for the lever "9"; Fig. 12 shows a complete inward movement of the grooved plate 68; Fig. 13 shows the release of the "9" lever by the depression of the "0" lever; Fig. 14 shows the positions of the parts just after beginning the return to normal positions, to release the pawl from the teeth 77ᵃ; Fig. 25 shows a "9" lever depressed with the other parts in normal positions; Fig. 26 shows an operating crank movement to move the grooved plate 68 to a set position; Fig. 27 shows a further crank movement to permit the stack lock-bar to begin moving downward; Fig. 28 shows a still further crank movement to lower the said lock-bar to its limit of movement, and to begin to move the ejectors; Fig. 29 shows the ejection and the depression of the "0" lever to release the previously depressed "9" lever in a still further crank movement; and Fig. 30 shows a partial return of the crank to normal position, just beginning to retract the ejectors.

From the foregoing it will be seen that the respective grooved plates 65, 66, 67 and 68 are moved inwardly toward the operator for distances controlled by the depressed key lever in each group other than the "0" lever, and these set positions of the said plates contribute toward the coin stack selection.

In Figs. 7 and 15 are shown the equivalent of the bell-cranks shown in my co-pending applications, Serial Nos. 54,165, filed Oct. 5, 1915, and 95,440, filed May 4, 1916, and which will be termed similarly herein, there being two groups of three bell-cranks each and those of each group being slidably mounted upon the rod 86 and upon each other, as is clearly shown in Fig. 7.

The two-dollar-and-a-half gold coin bell-crank consists of a sleeve 117 having an arm 118 in pivotal engagement with the piston rod 58ᵃ, an arm 119 downwardly hooked at its outer end to enter a groove in the plate 66 when permitted to do so, an arm 120 likewise hooked to enter a groove in the plate 67 when permitted to do so, and a dependent leg 121 passed through the plate 71 and into the plate 69, the plate 71 being slotted and the plate 69 grooved for this purpose as will be later explained.

The one dollar bell-crank consists of a sleeve 122 having a hooked arm 123 extended over the plate 66 and in pivotal connection with the piston rod $59^a$, a hooked arm 124 over the plate 67, and a dependent leg 125 passed through the plate 71 and into the plate 69.

The fifty cent bell-crank consists of a sleeve 126 having a hooked arm 127 over the plate 66, a hooked arm 128 over the plate 67 and in pivotal connection with the piston rod $60^a$, and a dependent leg 129 passed through the plate 71 and into the plate 69.

The twenty-five cent bell-crank consists of a sleeve 130 having a hooked arm 131 over the plate 67 and in pivotal connection with the piston rod $61^a$, a hooked arm 132 over the plate 68, and a dependent leg 133 passed through the plate 72 and into the plate 70.

The ten cent bell-crank consists of a sleeve 134 having a hooked arm 135 over the plate 67 and in pivotal connection with the piston rod $62^a$, a hooked arm 136 over the plate 68, and a dependent leg 137 passed through the plate 72 and into the plate 70.

The five cent bell-crank consists of a sleeve 138 having a hooked arm 139 over the plate 67, a hooked arm 140 over the plate 68 and in pivotal connection with the piston rod $63^a$, and a dependent leg 141 passed through the plate 72 and into the plate 70.

The piston rods $55^a$, $56^a$, $57^a$, and $64^a$, of the twenty dollar, ten dollar, five dollar, and cent stacks have no bell-cranks and extend to a point, each, just above the respective grooved plates 65, 66, and 68, all of the last named piston rods and all of the hooked arms being normally arranged along the inner edges of the plates 65, 66, 67 and 68, toward the operator, and all of the dependent legs being arranged adjacent the inner edges of the plates 69, 70, 71 and 72 when said plates are in normal positions.

The plate 65 is provided with a single depth groove $55^b$ beneath the piston rod $55^a$ continued into a double depth groove $55^c$, and with a series of three short grooves $56^b$ beneath the piston rod $56^a$, and when this plate is moved so as to bring a groove beneath the said piston rods the latter may move downwardly, when the stack lock-bar is lowered, to carry the corresponding coins into the plane of the ejector bars.

The plate 66 has a groove $57^b$ beneath the piston rod $57^a$, with two grooves $119^a$ normally in line with the hooked arm 119 and two supplemental grooves $119^b$ to the right thereof, with two grooves $127^a$ normally in line with the hooked arm 127 and with two supplemental grooves $127^b$ to the right thereof, and with two alternate single and double depth grooves $123^a$, two single depth grooves $123^b$, and two double depth grooves $123^c$, the first of which, $123^a$, is normally in line with the hooked arm 123.

The plate 67 is provided with a single depth groove $124^a$ continued into a double depth groove $124^b$, with a single depth groove $124^c$ and with a double depth groove $124^d$ staggered with respect to the last named, the first two being normally in line with the hooked arm 124. The said plate is also provided with staggered single depth grooves $128^a$ and $128^b$ the former of which is normally in line with the hooked arm 128, with a continuous single depth groove $120^a$ normally in line with the hooked arm 120 and with a widened single depth portion $120^b$. The said plate is also provided with two single depth grooves $131^a$ normally in line with the hooked arm 131, and with two single depth grooves $131^b$ immediately to the right thereof, and with two single depth grooves $139^a$ normally in line with the hooked arm 139 and with two single depth grooves $139^b$ immediately to the right thereof. The said plate is also provided with two alternate single and double depth grooves $135^a$ normally in line with the hooked arm 135, with two single depth grooves $135^b$ immediately to the right thereof, and with two double depth grooves $135^c$ immediately to the right of said last named grooves.

The plate 68 is provided with a single depth groove $136^a$ in line with the hooked arm 136 continued into a double depth groove $136^b$ immediately to the right of which is a single depth groove $136^c$ staggered with respect to a complemental double depth groove $136^d$. Said plate is also provided with a single depth groove $140^a$ in line with the hooked arm 140 normally and with a single depth groove $140^b$ staggered with respect to the groove $140^a$. Said plate is also provided with a continuous single depth groove $132^a$ in line with the hooked arm 132 and which groove is widened at $132^b$ for approximately one-half its length, this plate also having the grooves $64^b$, to $64^e$, therein.

The extension 69 of the plate 66 is provided with a groove $121^a$ in which the leg 121 is arranged, said groove being provided with single length enlargements $121^b$ into each of which said leg may be forced. Said extension is also provided with a groove $129^a$ for the leg 129 having double length extensions $129^b$ into which said leg may be forced. Said extension is also provided with a groove $125^a$ for the leg 125 having double length extensions $125^b$ in turn extended into single length portions $125^c$, into any of which the said leg may be forced.

The extension 70 is precisely the same as the extension 69 and is provided with a groove $133^a$ enlarged, single length, at $133^b$ for the leg 133, with a groove 141ª enlarged, double length, at 141ᵇ for the leg 141, and with a groove 137ª enlarged, double length, at 137ᵇ in turn enlarged, single length, at 137ᶜ for the leg 137.

The laterally movable plate 71 is provided with a slot 121ᶜ through which the leg 121 passes into the plate 69, projections 121ᵈ being provided on the left hand of said slot adapted to enter the enlargements 121ᵇ when said plate is moved to the right to force the leg 121 into the respective enlargement if it should have been brought into register therewith in the inward adjustment of the plate 66 and extension 69. The plate 71 is also provided with a slot 129ᶜ for the passage of the leg 129 in turn provided with projections 129ᵈ adapted to enter the enlargements 129ᵇ in the lateral movement of said plate. The plate 71 is also provided with a slot 125ᵈ having double length projections 125ᵉ and single length projections 125ᶠ adapted to enter the respective groove 125ª and enlargements 125ᵇ and 125ᶜ in the movement of said plate to the right.

The laterally movable plate 72 is provided with a slot 133ᶜ for the leg 133 having projections 133ᵈ adapted to enter the enlargements 133ᵇ of the groove 133ª, with a slot 141ᶜ for the leg 141 having projections 141ᵈ adapted to enter the enlargements 141ᵇ of the groove 141ª, and with a slot 137ᵈ having projections 137ᵉ and single length projections 137ᶠ adapted to enter the respective enlargements 137ᵇ and 137ᶜ of the groove 137ª.

The laterally movable plates are shown in full lines in Fig. 16, with respect to their slots, and indicated by dotted lines in Fig. 17, and from the latter it will be noted that the plates 71 and 72 may be moved to the right, when any of the legs are in their normal positions shown, without interference and without affecting the positions of said legs. However, should the extensions 69 and 70 be inwardly adjusted to bring a leg in line with either of the respective groove enlargements, the laterally movable plates 71 and 72 will force said leg or legs into said enlargements, in the right hand movement of the slotted plates, and this would move the corresponding bell-crank or bell-cranks to the right and carry their hooked arms to the right of their normal positions, and thus to the right of the grooves normally in line therewith.

By reference to Fig. 17, it will be seen that neither the piston rods 55ª, 56ª, 57ª, 64ª, nor any of the bell-cranks, may move downwardly when the plates 65, 66, 67 and 68 are in their normal positions, and thereby the plates 69 and 70, the hooked arms 119 and 120 being integral, as are the hooked arms 127 and 128, 123 and 124, 131 and 132, 139 and 140, and 135 and 136, it being noted that one arm of each bell-crank is directly over a groove whereas the other arm thereof is not, thereby preventing lowering of the stack pistons even though the lock-bar 54 should be lowered in the crank handle operation forwardly, and thus no coins would be ejected.

However, should the plate 66 be moved inwardly to the line "3," the bell-crank having the arms 119 and 120 would rock downwardly in view of the grooves 119ª and 120ª for one space, whereas the bell-crank having the arms 127 and 128 would not rock as no grooves would be thereunder, it being understood that the plate 67 has not been moved at this time, and the bell-crank having the arms 123 and 124 would not rock as there would be no groove under the former.

In this inward movement of the plate 66 the extension 69 thereof had been moved correspondingly as had the laterally movable plate 71, whereby the legs 121, 129 and 125 occupied the line "3" of said last named plate and of the extension 69, and in this connection it should be observed that while the plates 71 and 72 are simultaneously moved laterally, each may be moved inwardly or outwardly with its extension 69 or 70 independently of the other.

When, in the operation of the operating handle, the plates 71 and 72 are moved to the right no effect is had on the leg 121 of the bell-crank being described for the reason that the slot 121ᶜ is of greatest width on this line "3" and the groove 121ª presents no enlargement 121ᵇ to the said leg.

The legs 129 and 125, however, are now opposite the enlargements 129ᵇ and 125ᵇ of the grooves 129ª and 125ª, respectively, and opposite the respective projections 129ᵈ and 125ᵉ of the slots 129ᶜ and 125ᵈ, whereby the respective bell-cranks will have been moved to the right one space, thereby carrying their hooked arms 127 and 128, and 123 and 124, over the grooves 127ᵇ and 128ᵇ, and 123ᵇ, and past the groove 124ª, and the arms 127 and 128 may drop but the arms 123 and 124 cannot drop, although the latter could have dropped had they been on the line "2" instead of the line "3" for the reason that a two-space movement would have occurred to the right and said arms would then have been over the double depth grooves 123ᶜ and 124ᵈ and two coins would then have been in position for ejection from the dollar stack 36 as soon as the lock-bar 54 was lowered.

The foregoing is true with respect to the bell-cranks spanning the grooved plates 67 and 68 and in constant engagement with the extension 70 and laterally movable plate 72, it being observed that the extensions 69 and 70, and laterally movable plates 71 and 72, are alike for each pair, and the left hand side of the plates 67 and 68 are identical although the right hand sides are different, that of the plate 67 resembling the right hand side of the plate 66 but the right hand side of the plate 68 is provided only with the stepped grooves 64^c to 64^b for the pennies. If 64^b is beneath the piston rod 64^a only one penny is in position for ejection, two pennies with the groove 64^c, three pennies for the groove 64^d, and four pennies for the groove 64^e, there being two sets of the penny grooves.

Assuming that two dollars and eighty cents is to be paid out, the plate 66 would have moved forward two spaces to bring the "2" line thereof and of the plate 71 in line with the arm 119 and leg 121, and the plate 67 would have been moved to bring the line "8" thereof in line with the respective arms and the plate 72 similarly to the line "8" thereof in line with the respective legs. The arm 119 would now be to the left of the groove 119^b, the arm 120 over the groove 120^a, and the leg 121 opposite the groove enlargement 121^b and slot projection 121^d, whereby this bell-crank would be moved one space to the right to bring, in the lateral movement of the plate 71, the arm 119 over the groove 119^b, the arm 120 over the groove 120^b, and a two dollar and a half gold piece would be in position for ejection when the lock-bar 54 has been lowered. Similarly, the arm 131 would now be on the "8" line of the plate 67, over the groove 131^a, the arm 132 of the same bell-crank would now be over the groove 132^a, and the leg 133 would be on the line "8" of the plate 72 at its right hand limit of movement, and a twenty five cent coin would be in position for ejection as soon as the lock-bar was lowered. Also, arm 139 of the five cent bell-crank would be on the "8" line of plate 67 and the arm 140 thereof would be in initial position, inasmuch as the plate 68 was not moved inwardly from zero, the former arm being to the left of the groove 139^b and the latter to the left of the groove 140^b, whereas the leg 141 would be on the "8" line of the plate 72 to the left of the enlargement 141^b and in line with the projection 141^d, ready to be moved one space to the right in the lateral movement of the plate 72, after which a five cent coin would be ready for ejection after the lock-bar had been lowered. Had the amount included four cents instead of the zero in penny digit, the five cent coin would still have been ejected in a full machine operation inasmuch as the arm 140 would still have been moved over to the right above the groove 140^b, and the four depth groove 64^e would have been carried beneath the piston rod 64^a and four pennies would be moved into ejecting position, ready for ejection upon full machine operation.

Had the amount included more than four cents the five cent coin would not have been lowered into ejecting position for the reason that movement to the right of its bell-crank would have carried the arm 140 to the right of the groove 140^a, as for instance seven cents, but the two dollar and a half gold coin and the twenty-five cent coin would still have been ready for ejection. For this amount the arm 135 would be on the "8" line of the plate 67 to the left of the groove 135^b and the arm 136 of this bell-crank would be over the groove 136^b, whereas the leg 137 thereof would be in line with the enlargement 137^b and the projection 137^c, whereby said bell-crank would be moved one space to the right by the plate 72, thereby carrying the arm 135 over the groove 135^b and the arm 136 over the groove 136^c, and this bell-crank could then rock to bring a ten cent coin into ejecting position, the double depth groove 64^c being beneath the piston rod 64^a to permit lowering two pennies into ejecting position.

While the arrangement of the grooves and slots is arbitrary, the form shown is carefully calculated to produce the desired results, but I do desire to provide the inwardly and outwardly slidable plates, with means for controlling the degree of movement thereof, and the laterally movable plates operating in conjunction with the extensions thereunder of the plates 66 and 67.

Reverting to page 6 of this specification, attention is drawn to the use of the reference characters 74^a—77^a and 74^b—77^b although these are not separately illustrated, their use being to distinguish one set from another, and a somewhat diagrammatic showing thereof with respect to their location is made in Fig. 17.

Figure 1:
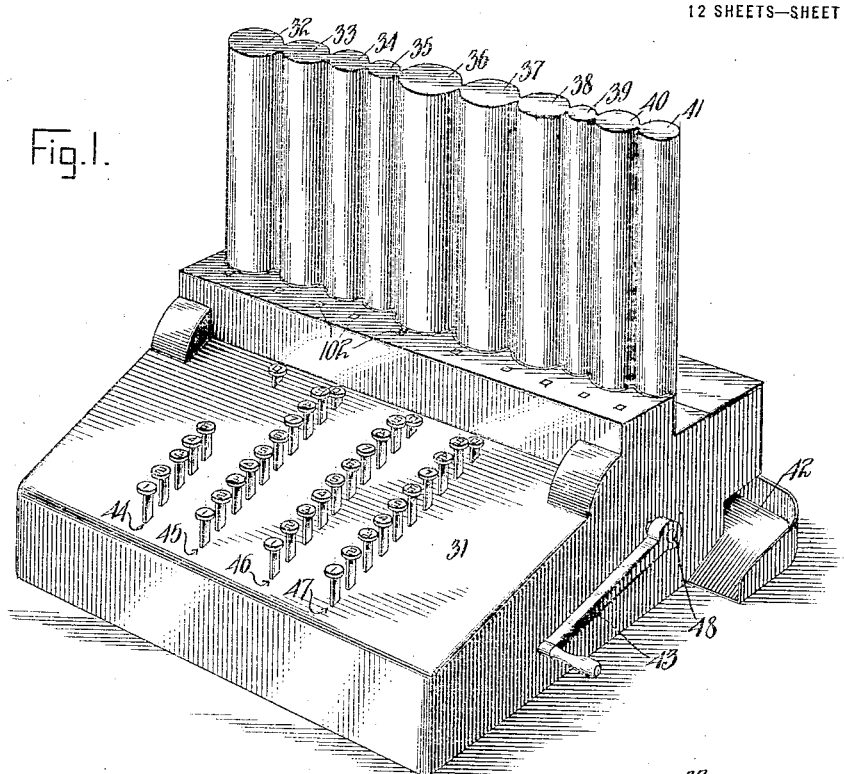
Figure 1 is a front perspective view of one embodiment of my invention.
Figure 2:
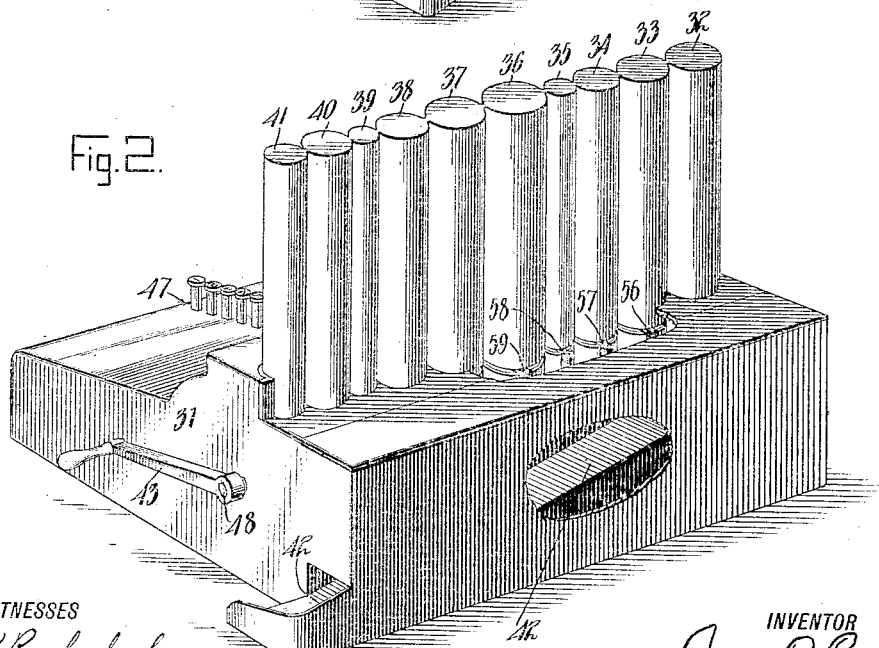
Fig. 2 is a rear perspective view thereof, partly broken away.

Attention is also drawn to Figs. 1 and 3 wherein the 44 bank of keys is not shown complete, this being for the reason that salaries or wages over fifty dollars a week are usually paid by check, but I may complete the said bank if desired, and I may also add other banks, according to the requirements of the user.

The teeth 74^a—77^a are for moving the respective plates inwardly in degrees corresponding to the particular one of the said teeth engaged by the respective pawls 80—83, with the respective "0" keys released and raised from normally depressed positions, whereas the teeth 74^b—77^b are for engagement by the respective pawls 110 of the "0" keys when depressed to prevent inward movement of the corresponding grooved plates from normal position or from the position into which they may have been set by the depression of one of the keys in the corresponding banks, but these pawls 110 do not prevent outward movement of said grooved plates into normal positions upon the return of the pawls 80—83 to normal positions.

From the foregoing it will be seen that the paying off of a force of employees is expeditiously performed and without mental effort other than key selection, that relatively few parts are employed, and that a very compact and comparatively inexpensive machine of this class is provided.

When the operating crank is released after an ejection the parts are all returned to normal positions and it will be noted that the right hand edges of the slots in the laterally movable plates return the bell-cranks to their initial positions, regardless of whether they had been moved one or two spaces, the right hand slot edges being all on straight lines as are also the left hand edges of all the grooves in the extensions 69 and 70 thereunder, the several legs all then being between the straight edges of the slots and grooves, and the movement of the plates 71 and 72 to the left occurs when the operating crank had traveled approximately one-half of its possible travel, before the grooved plates are moved outwardly to normal positions, and said plates are moved inwardly into set positions before the laterally movable plates are moved to the right.

Inasmuch as no ejection occurs until all the plates and bell-cranks are in set positions and the lock-bar 54 has been lowered to permit downward piston movement in those stacks in which such movement is permitted by the relative positions of the grooves in the respective plates, the operating crank may be returned to initial position at any time previous to the actual ejection for correction of a mistake in the selection of the computing keys and, because of a locking pawl for all of the keys of each bank, the depression of one key automatically releases another depressed key, thereby enabling the corrections above referred to.

Particular attention is drawn to the safety features of the machine because of the positive movement of parts at definite moments, and because of secondary locks which do not wait for the release by the primary locks, but, instead, overlap the latter. The rod 86 is moved by the cams 84$^b$ behind the shoulder 78$^c$ of the pawl carrier plates 78 just before the lugs 84$^a$ pass above the arms 78$^a$ of said carrier plates, and thus prevent outward movement of the pawl carrier while the ejection is being made and, upon the return of the parts to normal positions, the lugs 84$^a$ engage the arms 78$^a$ just before the rod 86 is released from behind the shoulder 78$^c$.

Likewise, the "0" lever pawls 110 prevent further inward movement of the grooved plates than their positions at the instant of "0" lever depressions, whereas the pawls 80$^c$,—83$^c$, prevent grooved plate movement as long as they are in engagement with the respective ratchet bars.

The "0" levers being all depressed simultaneously at approximately the moment of coin ejection, all the previously depressed levers from "1" to "9" are immediately raised, but the "0" pawls 110 are at this time moved into ratchet bar engagement and the pawls are still in such engagement, Figs. 13 and 29, and the grooved plates are immovably held. Upon inward movement of the pawl carrier the pawl arms 80$^a$—83$^a$ are moved downwardly to raise the respective pawls 80$^c$—83$^c$ out of ratchet bar engagement, but the stops 111 prevent inward grooved plate movement whereas the pawls 110 prevent such movement up to the time of pawl engagement with said stops, and the plates are positively forced to initial positions by said pawls and stops.

Having fully described my invention, what I claim as new, and desire to secure by Letters Patent, is:—

1. In a machine of the class described, a plurality of selective keys from zero to nine arranged in digit banks, a plurality of coin stacks for different monetary denominations, means for ejecting the largest denominational units to make up a desired amount under the control of the selective keys from 1 to 9, means operable by the depression of said zero keys for rendering said ejecting means inoperative, an oscillatory element disposed over and arranged for normally maintaining the zero keys in depressed position, means for locking a normally raised key in depressed position, means for returning zero keys out of raised position to depressed position, and means for returning said depressed normally raised keys to raised position upon the return of said zero keys to normal positions.

2. In a machine of the class described, an operating element, a plurality of selective keys from zero to nine arranged in digit banks, a plurality of coin stacks, coin supporting pistons therein, means movable into positions determined by the selective keys from 1 to 9 for controlling the movement of said pistons to move desired coins into ejecting positions, means operable by the depression of said zero keys for rendering said ejecting means inoperative, means for maintaining the zero keys in normally depressed positions to prevent actuation of said piston control means, and means for releasing a zero key by the depression of another key in the respective bank to permit movement of said piston control means.

3. In a machine of the class described, an operating element, a plurality of selective keys from zero to nine arranged in digit banks, a plurality of coin stacks, coin supporting pistons therein, grooved plates movable into positions determined by the selective keys from 1 to 9 for controlling the movement of said pistons to move desired coins into ejecting positions, means operable by the depression of said zero keys for rendering said ejecting means inoperative, means for maintaining the zero keys in normally depressed positions to prevent actuation of said piston control means, and means for releasing said last named means upon the depression of another key in any bank.

4. In a machine of the class described, an operating element, a plurality of selective keys from zero to nine arranged in digit banks, a plurality of coin stacks, coin supporting pistons therein, a grooved plate for each bank of keys movable into positions determined by the keys from 1 to 9 of each bank, grooved extensions on certain of said plates coöperating therewith for controlling the movement of the respective pistons to move desired coins into ejecting position, and means for ejecting the moved coins.

5. In a machine of the class described, an operating element, a plurality of selective keys from zero to nine arranged in digit banks, a plurality of coin stacks, coin supporting pistons therein, a grooved plate for each bank of keys, a ratchet bar on each plate, a pawl adapted for engagement with each of said bars, means for maintaining the zero keys in depressed positions to prevent such pawl engagement, said means being released upon the depression of another key in the respective banks, means on the selective keys from 1 to 9 for forcing the pawls into engagement with the respective bars, and means for moving said pawls to move the respective plates into definite positions.

6. In a machine of the class described, an operating element, a plurality of selective keys from zero to nine arranged in digit banks, a plurality of coin stacks, coin supporting pistons therein, a grooved plate for each bank of keys, a ratchet bar for each plate, a pawl adapted for engagement with each of said bars and operable by any key in the respective bank, means for maintaining the zero keys in normally depressed positions to prevent such pawl engagement, means on a depressed key from 1 to 9 for releasing the zero key of the respective bank, means on such depressed keys from 1 to 9 for forcing said pawls into engagement with the respective bars, and means for moving said pawls to move the respective plates into definite positions to permit movement of the respective pistons.

7. In a machine of the class described, an operating element, a plurality of selective keys from zero to nine arranged in digit banks, a plurality of coin stacks, coin supporting pistons therein, a grooved plate for each bank of keys for controlling the movement of certain of said pistons to carry desired coins into ejecting positions, a ratchet bar on each plate, a pawl common to all the keys of a bank adapted for engagement with the respective bar, means for normally maintaining the zero keys in depressed positions to prevent such engagement, means on a depressed key from 1 to 9 for releasing the zero key of the respective bank, and means on the keys from 1 to 9 for progressively advancing the period of engagement of the pawl of each bank, from 9 key to 1, with the respective bar to move the respective plates into definite positions determined by the particular selective key depressed from normal position of the corresponding bank.

8. In a machine of the class described, an operating element, a plurality of selective keys from zero to nine arranged in digit banks, a plurality of coin stacks, coin supporting pistons therein, a grooved plate for each digit, an extension thereon also grooved and coöperating with said plate to control certain of said pistons to permit moving certain of said coins into ejecting positions, means on the zero keys for preventing plate movement, means on the remaining keys of each bank for progressively increasing the moment of movement of said plate to control the distance of movement, and means for moving said plates when said zero keys are inoperative.

9. In a machine of the class described, an operating element, a plurality of selective keys from zero to nine arranged in digit banks, a plurality of coin stacks, coin supporting pistons therein, a grooved plate for each digit, an extension on certain of said plates and movable therewith and coöperating with said plates to control piston movement to move desired coins into ejecting positions, means controlled by said keys for moving said plates into definite positions, and transversely movable slotted plates coöperating with said first named plates to control said pistons.

10. In a machine of the class described, an operating element, a plurality of selective keys from zero to nine arranged in digit banks, a plurality of coin stacks, coin supporting pistons therein, an inwardly adjustable grooved plate for each digit controlled by the respective keys from 1 to 9, a transversely movable slotted plate coöperating with one of said grooved plates for controlling certain of said pistons, means connected with said operating element for positively moving said slotted plate, said pistons moving coins determined by the positions of said plates into ejecting position, and means for ejecting the coins so moved.

11. In a machine of the class described, an operating element, a plurality of selective keys from zero to nine arranged in digit banks, a plurality of coin stacks, coin supporting pistons therein, an inwardly adjustable grooved plate for each digit controlled by the respective keys from 1 to 9, means for moving said plates when permitted to move, means for locking said plates in adjusted positions controlled by the respective zero keys, transversely movable means coöperating with one of said plates for controlling certain of said pistons, said pistons moving coins determined by the positions of said coöperating means and plate for the respective bank of keys, and means for ejecting the coins so moved.

12. In a machine of the class described, an operating element, a plurality of selective keys from zero to nine arranged in digit banks, a plurality of coin stacks, coin supporting pistons therein, inwardly adjustable grooved plates controlled by the keys from 1 to 9 of the respective digits in turn controlling said pistons, grooved extensions on certain of said plates coöperating therewith to control said pistons for the respective banks of keys, transversely movable slotted plates on said grooved extensions also coöperating to control the respective pistons, said pistons moving desired coins determined by the positions of said plates and extensions into ejecting positions, and means for ejecting the coins so moved.

13. In a machine of the class described, a plurality of inwardly adjustable grooved plates, a plurality of selective keys from zero to nine arranged in digit banks, one for each plate, ratchets bars on said plates, a carrier, a plurality of pawls on the carrier, one for each bank of keys, and operable by each of the keys thereof, adapted to be moved into engagement with the respective ratchet bars, an operating element, means thereon for moving said pawl carrier inwardly to move the engaged bars and plates accordingly, and coin delivery mechanism controlled by said plates.

14. In a machine of the class described, a plurality of inwardly adjustable grooved plates, a plurality of selective keys from zero to nine arranged in digit banks, one for each plate, a ratchet bar on each plate, an operating element, a pawl carrier operable thereby, a pawl on said carrier common to each bank of keys, means on each zero key for preventing engagement of the respective pawl with the corresponding ratchet bar to prevent movement of the respective plate in the pawl carrier movement, and progressively spaced means on the keys of each bank, from 9 to 1, for forcing the corresponding pawl into ratchet bar engagement at corresponding points along the length of said bar to move the respective plate different distances into definite positions determined by the particular key in pawl actuating position.

15. In a machine of the class described, including a plurality of coin stacks, coin delivery means, and a plurality of selective keys from zero to nine controlling said means, a low change warning for each of said stacks, and means for locking said machine against movement upon the operation of said low change warning comprising an element on the operating member of said machine, a normally inoperative detent adapted to bear thereon, and an element locking said detent against movement upon the operation of said low change warning.

16. In a machine of the class described, a plurality of selective keys from zero to nine arranged in digit banks, differential levers for the keys from 1 to 9 of each bank, means for normally maintaining said levers in raised positions, a lever for each zero key, means for maintaining said zero levers normally in lowered positions, an operating element, coin selecting means, and means movable by said operating element for moving said coin selecting means, said last named means being held out of operative engagement with said coin selecting means by the respective depresed zero levers.

17. In a machine of the class described, a plurality of selective keys from zero to nine arranged in digit banks, differential levers for the keys from 1 to 9 of each bank, means for normally maintaining said levers in raised positions, a lever for each zero key, means for normally maintaining said zero levers in lowered positions, an operating element, coin selecting means, and means movable by said operating element, for moving the coin selecting means, in constant contact with depressed zero levers to prevent operative engagement with said coin selecting means.

18. In a machine of the class described, a plurality of selective keys from zero to nine arranged in digit banks, differential levers for the keys from 1 to 9 of each bank, means for normally maintaining said levers in raised positions, a lever for each zero key, means for normally maintaining said zero levers in lowered positions, an operating element, coin selecting means, and a pawl for each bank, adapted to engage with said coin selecting means to move the same, movable by said operating element and normally held out of engagement with said coin selecting means by the respective depressed zero lever.

19. In a machine of the class described, a plurality of selective keys from zero to nine arranged in digit banks, levers for the keys from 1 to 9 normally held in raised positions, a lever for each zero key normally held in lowered positions, an operating element, coin selecting means for each digit, a pawl for each digit adapted to engage the respective coin selecting means to move the same in the movement of said pawl by said operating element, and differential means on the levers of the keys from 1 to 9 for moving the respective pawl into engagement with the respective coin selecting means to move the latter accordingly.

20. In a machine of the class described, a plurality of selective keys from zero to nine arranged in digit banks, differential levers for the keys from 1 to 9 normally maintained in raised positions, a lever for each zero key normally held in lowered position, an operating element, coin selecting means for each digit, a pawl for each digit movable by said operating element and adapted to engage with the respective coin selecting means to move the latter a distance determined by a depressed differential lever, and means for locking said coin selecting means against movement when said pawls are out of engagement therewith, the depressed zero levers serving to prevent such pawl engagement with said coin selecting means.

21. In a machine of the class described, a plurality of selective keys from zero to nine arranged in digit banks, levers for the keys from 1 to 9 normally held in raised positions, a lever for each zero key normally held in lowered position, an operating element, a pawl for each digit slidable by said operating element and consisting of two oppositely directed arms extending the width of a bank of levers and an arm provided with a downwardly directed hook, coin selecting means for each digit adapted to be engaged by the respective hooked arm to move with the pawl, differential cam surfaces on the levers from 1 to 9 of each bank adapted to differentially rock the respective pawls into and out of engagement with the respective coin selecting means to move the latter corresponding distances, and cam means on said zero levers for normally holding said pawls out of engagement with said coin selecting means irrespective of the sliding movement of said pawls by said operating element.

JAMES R. COMBS.

Copies of this patent may be obtained for five cents each, by addressing the "Commissioner of Patents, Washington, D. C."